Patented May 25, 1954

2,679,492

UNITED STATES PATENT OFFICE 2,679,492

SOLUTIONS OF ACRYLONITRILE POLYMERS

Noel Arthur Hampson, John Downing, and James Gordon Napier Drewitt, Spondon, near Derby, England, assignors to British Celanese Limited, a corporation of Great Britain No Drawing. Application November 19, 1951, Serial No. 257,197

Claims priority, application Great Britain December 5, 1950

10 Claims. (Cl. 260—29.6)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers, especially such as are fibre-forming, can be dissolved in mixtures of nitromethane with compounds containing two or more phenolic hydroxyl groups, in which the proportion by weight of nitromethane exceeds that of the phenolic compound. Compounds containing two or more phenolic hydroxyl groups are hereinafter referred to as polyhydric phenols.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvent mixtures than is polyacrylonitrile itself, and it will therefore be convenient in describing the invention in more detail to refer specifically to polyacrylonitrile.

The most effective of the solvent mixtures of the invention comprise nitromethane and resorcinol or catechol. We have found that as a general rule polyhydric phenols in which the hydroxyl groups are asymmetrically arranged (with respect to the centre of the benzene nucleus) give better solvent mixtures than those in which they are symmetrically arranged; moreover we have found that mono-nuclear phenols are to be preferred to di- or poly-nuclear, and that of the mono-nuclear phenols the most useful are the polyhydroxy benzenes. Thus resorcinol and catechol are better for the present purpose than hydroquinone, and pyrogallol than phloroglucinol. Similarly, among the poly-hydroxy lower alkylphenols homocatechol, 2-methyl-resorcinol and orcinol are better than methyl-hydroquinone, though less useful than resorcinol and catechol. It may be noted that the polyhydroxy benzenes and lower alkyl-benzenes in which the hydroxyl groups are asymmetrically arranged with respect to the centre of the nucleus are more soluble in water and have considerably lower melting points than those in which the hydroxyl groups are symmetrically arranged.

The solvent mixture may contain, besides the nitromethane and polyhydric phenol, a small proportion of water, especially between 5% and 15% of the total weight of the solvent mixture. The presence of water in many cases has the effect of decreasing the liability of the solution to gel at ordinary or moderately elevated temperatures, e. g. temperatures up to about 40° or 50° C. Also the solvent mixtures may contain small proportions of other substances, which may or may not themselves be solvents for polyacrylonitrile, always provided that the proportion of such other substance is not sufficient to destroy the solvent power of the mixture. But we prefer to use as solvent a mixture consisting of the nitromethane and polyhydric phenol, with or without water, substantially free from other substances.

It is desirable that the proportion of polyhydric phenol in the solvent mixture should not be so high that the phenol and nitromethane form two separate phases at room temperature. Subject to this, mixtures containing about 70–95%, and especially 75–90%, by weight of nitromethane and 5–30%, and especially 10–25%, of polyhydric phenol, are preferably employed. Mixtures containing 75–85% of nitromethane and 15–25% of resorcinol or catechol, or 75–85% of nitromethane, 5–20% of resorcinol or catechol, and 8–15% of water, are very useful. These proportions are all by weight.

The polyacrylonitrile may be dissolved in the mixture of nitromethane and polyhydric phenol by adding it to the required amount of the mixture in the cold, and then heating to a temperature above 50° C. For instance, when the solvent mixture consists of nitromethane and resorcinol or catechol, with or without water, in the preferred proportions as set out above, solution takes place at a reasonable rate at 50° to 60° C., though higher temperatures, e. g. up to 110° C. or higher, under pressure when necessary, may be used; for example temperatures above 80° C. may be found advantageous when a relatively concentrated polyacrylonitrile solution, e. g. a 20 to 25% solution, is to be made. When mixtures are used which are not such good solvents, e. g. mixtures of nitromethane with phloroglucinol, homocatechol or orcinol, higher temperatures may be required whatever the concentration of the solution; thus temperatures above 90° C., for example between 90° and 150° C., may be employed. Another method of dissolving the polymer, by which more rapid solution may often be achieved, is to add the polyacrylonitrile to the nitromethane, heat the nitromethane either to the solution temperature, or to a somewhat lower temperature, and then add the polyhydric phenol and any water which is to be used, raising the temperature still higher if necessary or desirable. Moreover, the nitromethane, with or without the polyhydric phenol according to which of the above methods is adopted, may be heated to or near the temperature at which solution is to be effected before the polyacrylonitrile is added. The solutions once formed can be cooled considerably without undergoing immediate gelling; for example, solutions of polyacrylonitrile in mixtures of nitromethane and resorcinol containing 15 to 25% of resorcinol, and having a polyacrylonitrile concentration below about 20%, can as a rule be kept for some hours even at room temperature without gelling, while similar solutions in which catechol replaces the resorcinol can be so maintained at temperatures not very much higher than room temperature. As stated above, the presence of water often lowers the temperature at which a solution can be held for a given time without gelling.

When the solutions are to be used for the production of one- or two-dimensional shaped articles, such as fibres or films, by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5–20%, concentrations of 10%–20% being particularly useful.

The shaped articles may be made by wet-spinning methods, preferably using as the coagulating liquid an aromatic hydrocarbon or a halogenated hydrocarbon as described in U. S. patent application S. No. 246,718 filed September 14, 1951, of A. Hodge, J. Downing, and J. G. N. Drewitt, or, better still, a carboxylic ester of boiling point above 250° C., especially a di-alkyl phthalate, as described in British patent application No. 29,773/50, of J. Downing and J. G. N. Drewitt. It is usually preferable that the spinning solution should be at an elevated temperature, especially between about 60° and 95° C., and that the coagulating liquid also should be heated to a temperature within this range.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example the fibres, after leaving the coagulating bath, may be wound up and washed (e. g. in the form of multi-filament yarns), and then stretched while heated; for example they may be stretched in hot air, wet steam, or water at a temperature above 80° C. as described in U. S. patent application S. No. 3,368 filed January 20, 1948, or while they are passed in contact with hot metal surfaces e. g. the surface of a plate or roller kept at about 120°–150° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C., as described in U. S. patent application S. No. 3,368 filed January 20, 1948, and now abandoned. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

The invention is illustrated by the following examples. The parts given are all parts by weight.

Example I 100 parts of polyacrylonitrile having a viscosity (in 1% dimethyl formamide solution at 20° C.) of 3.2 centistokes and made by polymerising acrylonitrile in about 18 times its weight of water, using ammonium persulfate as catalyst, was added to 600 parts of a mixture of nitromethane and resorcinol in a ratio by weight of 4:1, and the mixture heated with stirring to 60° C. until a clear solution had been formed. This solution could be converted into fibres by extrusion at 80° C. into dibutyl phthalate at about the same temperature.

Example II

The process of Example I was repeated, using as the solvent a mixture of nitromethane, resorcinol and water in a ratio by weight of 8:1:1.

Example III 100 parts of polyacrylonitrile of viscosity (in 1% dimethyl formamide solution at 20° C.) 3.5 centistokes, and made as described in Example I, was added to 450 parts of a mixture of nitromethane and catechol in a ratio by weight of 4:1, and the mixture heated to 100° C. with stirring until a clear solution had been formed. The solution was cooled to about 80° C., and converted into fibres by extrusion at this temperature into dibutyl phthalate also at 80° C.

Having described our invention, what we desire to secure by Letters Patent is:

1. Compositions comprising a polymer selected from the group which consists of fibre-forming polyacrylonitrile and fibre-forming acetone-insoluble binary copolymers of acrylonitrile with another monovinyl compound containing at least 85% of acrylonitrile, dissolved in a solvent mixture comprising a major proportion of nitromethane and a minor proportion of a compound selected from the group which consists of di- and tri-hydroxy benzenes and alkyl benzenes in which the hydroxyl groups are attached to nuclear carbon and are arranged asymmetrically with respect to the centre of the benzene nucleus.

2. Compositions according to claim 1, wherein the solvent mixture contains water in a single liquid phase with the nitromethane and hydroxy-compound.

3. Compositions comprising a polymer selected from the group which consists of fibre-forming polyacrylonitrile and fibre-forming acetone-insoluble binary copolymers of acrylonitrile with another monovinyl compound containing at least 85% of acrylonitrile, dissolved in a solvent mixture comprising a major proportion of nitromethane and a minor proportion of resorcinol.

4. Compositions comprising a polymer selected from the group which consists of fibre-forming polyacrylonitrile and fibre-forming acetone-insoluble binary copolymers of acrylonitrile with another monovinyl compound containing at least 85% of acrylonitrile, dissolved in a solvent mixture comprising a major proportion of nitromethane and a minor proportion of catechol.

5. Compositions comprising a polymer selected from the group which consists of fibre-forming polyacrylonitrile and fibre-forming acetone-insoluble binary copolymers of acrylonitrile with another monovinyl compound containing at least 85% of acrylonitrile, dissolved in a solvent mixture comprising 75–85% by weight if nitromethane and 15–25% by weight of resorcinol.

6. Compositions comprising a polymer selected from the group which consists of fibre-forming polyacrylonitrile and fibre-forming acetone-insoluble binary copolymers of acrylonitrile with another monovinyl compound containing at least 85% of acrylonitrile, dissolved in a solvent mixture comprising 75–85% by weight of nitromethane and 15–25% by weight of catechol.

7. Compositions comprising a polymer selected from the group which consists of fibre-forming polyacrylonitrile and fiber-forming acetone-insoluble binary copolymers of acrylonitrile with another monovinyl compound containing at least 85% of acrylonitrile, dissolved in a homogeneous solvent mixture containing 75–85% by weight of nitromethane, 8–15% by weight of water, and 5–20% by weight of resorcinol.

8. Compositions comprising a polymer selected from the group which consists of fibre-forming polyacrylonitrile and fiber-forming acetone-insoluble binary copolymers of acrylonitrile with another monovinyl compound containing at least 85% of acrylonitrile, dissolved in a homogeneous solvent mixture containing 75–85% by weight of nitromethane, 8–15% by weight of water, and 5–20% by weight of catechol.

9. Compositions according to claim 1, wherein the concentration of the polymer in the solution is 5–25%.

10. Compositions according to claim 1, wherein the constitution and average molecular weight of the polymer are such that a 1% (by weight) solution of the polymer in dimethyl formamide has a viscosity between 2.5 and 4 centistokes at 20° C.

References Cited in the file of this patent

UNITED STATES PATENTS

| Number | Name | Date |
| --- | --- | --- |
| 2,404,721 | Houtz | July 23, 1946 |
| 2,417,294 | D'Alelio | Mar. 11, 1947 |
| 2,515,206 | Finzel et al. | July 18, 1950 |
| 2,585,499 | Rothrock | Feb. 12, 1952 |

FOREIGN PATENTS

| Number | Country | Date |
| --- | --- | --- |
| 991,394 | France | June 20, 1951 |